Oct. 9, 1923.

C. W. SHELDEN 1,470,295

HOG RING

Filed April 13, 1923

Inventor
Charles W. Shelden.
by Ewing & Hayes, Att'ys.

Patented Oct. 9, 1923.

1,470,295

UNITED STATES PATENT OFFICE.

CHARLES W. SHELDEN, OF DIAGONAL, IOWA.

HOG RING.

Application filed April 13, 1923. Serial No. 631,903.

*To all whom it may concern:*

Be it known that I, CHARLES W. SHELDEN, a citizen of the United States, and a resident of Diagonal, in the county of Ringgold, State of Iowa, have invented a certain new and useful Hog Ring, of which the following is a specification.

This invention relates to improvements in hog rings.

The object of my invention is to provide a hog ring of simple and durable construction, and one which may be easily and quickly attached to the hog's snout, and which, when attached, will be effective in its operation as far as preventing the animal from rooting, and one which, when attached, cannot be easily removed, as is the case with the single rings which have heretofore been quite universally used.

My invention consists in the construction, arrangement and combination of the various parts of the device, whereby the objects contemplated are attained, as hereinafter more fully set forth, pointed out in my claims, and illustrated in the accompanying drawings, in which:

Figure 2:
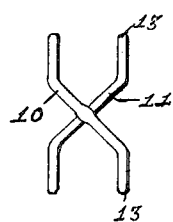
Figure 2 is a plan view of the ring.
Figure 3:
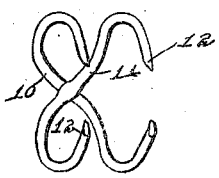
Figure 3 is a perspective view of the ring in its open position.
Figure 4:
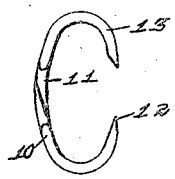
Figure 4 is an end elevation of the same.

My improved ring is formed of two pieces of wire 10 and 11, each of which has each end sharpened or pointed at 12. The wires are arranged in such a manner as to cross each other, and the intersecting portion of the two wires are welded together either electrically or otherwise, in such a manner that the central portions of the members 10 and 11 stand substantially at right angles to each other, as clearly shown in Figure 2. The ends of each of the members 10 and 11 are then bent until the corresponding ends of the two members are parallel with each other, after which they are formed with the hook portions 13 so that they represent substantially the letter C when viewed from the end, as clearly illustrated in Figure 4.

Figure 1:
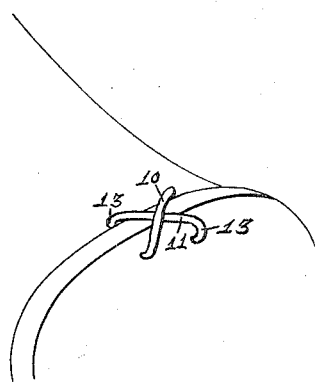
Figure 1 is a perspective view of my improved ring showing the manner in which it is applied to the gristle portion of the animal's snout.

The ring is placed on the gristle portion of the animal's snout in the manner illustrated in Figure 1, after which the points 12 are squeezed together by means of suitable pliers in the usual manner. This provides a ring which, when placed in position, cannot be easily worked loose, and at the same time effectively preventing the animal from rooting.

It will readily be seen that the device will be permanently anchored against any great amount of movement.

I am well aware of the fact that the idea of a double ring is not new, but as far as I know, those that have been previously used or constructed are provided with members for connecting the two ring members, which run parallel with the gristle portion of the animal's snout, but these rings are more cumbersome and more liable to catch on snags and other obstructions, and on account of their being formed of substantially two rings connected by parallel members, one of the rings has a tendency to twist relative to the other one, while with my improved ring, the members of one ring cross the members of the opposite ring and the intersecting members secured together forming a sort of brace, whereby the ring members are rigidly supported relative to each other and the ring itself can be constructed of comparatively light material.

I claim as my invention:

1. A nose ring comprising two members having their central body portions crossed and rigidly secured at their point of intersection, and their ends formed into a hook so that the hook members of one of said members will lie opposite and parallel with the hook members of the opposite member, substantially as described and for the purposes stated.

2. A nose ring of the class described formed of two pieces of wire of substantially the same length having their central portions arranged substantially at right angles to each other and secured together at their intersection, the ends of each of said members being formed with hook portions, the corresponding hook portions of each of said members being parallel to each other.

Des Moines, Iowa, April 3, 1923.

CHARLES W. SHELDEN.